United States Patent
Morisset et al.

(10) Patent No.: US 7,957,882 B2
(45) Date of Patent: Jun. 7, 2011

(54) ONBOARD CONTROLLER SYSTEM

(75) Inventors: Robert J. Morisset, Calgary (CA); Douglas R. Hay, Calgary (CA); Mitch Morisset, Calgary (CA); Mark Ochitwa, Calgary (CA)

(73) Assignee: Magtec Products, Inc., Calgary, AB (CA)

( * ) Notice: Subject to any disclaimer, the term of this patent is extended or adjusted under 35 U.S.C. 154(b) by 1124 days.

(21) Appl. No.: 11/715,914

(22) Filed: Mar. 9, 2007

(65) Prior Publication Data

US 2007/0271022 A1    Nov. 22, 2007

Related U.S. Application Data

(60) Provisional application No. 60/781,423, filed on Mar. 10, 2006.

(51) Int. Cl.
*G06F 19/00* (2006.01)

(52) U.S. Cl. .......................... 701/93; 180/179

(58) Field of Classification Search .............. 701/29–36, 701/93–96; 180/170–179
See application file for complete search history.

(56) References Cited

U.S. PATENT DOCUMENTS

| | | |
|---|---|---|
| 3,718,202 A | 2/1973 | Brock |
| 3,878,915 A | 4/1975 | Purland et al. |
| 4,838,377 A | 6/1989 | Kozaki et al. |
| 5,101,926 A | 4/1992 | Berman et al. |
| 5,115,145 A | 5/1992 | Westberg et al. |
| 5,315,286 A | 5/1994 | Nolan |
| 5,394,135 A | 2/1995 | Stadler |
| 5,519,255 A | 5/1996 | Burtch et al. |
| 5,559,491 A | 9/1996 | Stadler |
| 5,635,901 A | 6/1997 | Weinblatt |
| 5,745,030 A | 4/1998 | Aaron |
| 5,828,297 A | 10/1998 | Banks et al. |
| 6,060,981 A | 5/2000 | Landes |
| 6,067,007 A | 5/2000 | Gioia |
| 6,157,317 A * | 12/2000 | Walker ........................ 340/7.1 |
| 6,356,186 B1 | 3/2002 | Price et al. |
| 6,581,712 B1 | 6/2003 | Nathans |
| 6,696,927 B2 | 2/2004 | Flick |
| 6,756,886 B2 | 6/2004 | Flick |
| 7,305,294 B2 | 12/2007 | Bate et al. |
| 7,659,811 B2 * | 2/2010 | Flick ........................... 340/441 |
| 7,671,727 B2 * | 3/2010 | Flick ........................... 340/466 |
| 2002/0170762 A1 | 11/2002 | Daneshmand |
| 2004/0075541 A1 | 4/2004 | Simoneau |
| 2004/0113761 A1 | 6/2004 | Borugian |

* cited by examiner

*Primary Examiner* — Richard M. Camby
(74) *Attorney, Agent, or Firm* — Diederiks & Whitelaw, PLC

(57) ABSTRACT

A system and method for safely slowing or stopping a vehicle by selectively replacing a genuine engine control signal with a spoofed engine control signal to slow or stop a vehicle in a gradual or stepped manor. The operator is allowed control of the vehicle (e.g. genuine engine control signal) if the speed is below a threshold speed and the operator is denied control of the vehicle (e.g. spoofed engine control signal) if the speed is above the threshold speed, thus forcing the vehicle to slow to the threshold speed. The threshold is gradually reduced over time, causing the operator to stop the vehicle.

5 Claims, 1 Drawing Sheet

ONBOARD CONTROLLER SYSTEM

CROSS-REFERENCE TO RELATED APPLICATIONS

The present application claims the benefit of U.S. Provisional Patent Application Ser. No. 60/781,423, filed Mar. 10, 2006 entitled "Onboard Controller System."

FIELD OF THE INVENTION

The present invention relates generally to an onboard controller system (OCS). More particularly, the present invention relates to a vehicle control unit for slowing or shutting down a vehicle remotely.

BACKGROUND OF THE INVENTION

It is somewhat difficult and risky to shut down a moving vehicle.

One commonly used method for stopping a vehicle having rubber tires involves the placement of a spike belt in the vehicle's path (belts having a number of hollow cylinders which puncture the tire and cause deflation in a controlled manner). However, this requires the spike belt be laid in the vehicle's path, does result in reduced control of the vehicle and only works with vehicles having tires (e.g. not for example, with tracked vehicles such as earth movers such as bulldozers or military vehicles such as armored personnel carriers).

Another method involves the sending of an electromagnetic pulse or energy wave at the vehicle to interfere with its electronic circuits. However, this requires close proximity to the vehicle and does not work with vehicles that do not rely heavily on electronics, for example large diesel engines in transport trucks.

It is, therefore, desirable to provide a vehicle control unit that provides for safely slowing or stopping a vehicle.

SUMMARY OF THE INVENTION

It is an object of the present invention to obviate or mitigate at least one disadvantage of previous methods and systems for stopping a vehicle.

U.S. patent application Ser. No. 10/791,574 published US 2005 0197744 for "Immobilizer system for vehicles" is incorporated herein by reference.

An onboard controller system (OCS) may resemble or connect with a vehicle in the ways described in US Publication No. 20050197744, which is incorporated herein by reference.

A system and method for safely slowing or stopping a vehicle by selectively replacing a genuine engine control signal with a spoofed engine control signal to slow or stop a vehicle in a gradual or stepped manor. The operator is allowed control of the vehicle (e.g. genuine engine control signal) if the speed is below a threshold speed and the operator is denied control of the vehicle (e.g. spoofed engine control signal) if the speed is above the threshold speed, thus forcing the vehicle to slow to the threshold speed. The threshold is gradually reduced over time, causing the operator to stop the vehicle.

Other aspects and features of the present invention will become apparent to those ordinarily skilled in the art upon review of the following description of specific embodiments of the invention.

BRIEF DESCRIPTION OF THE DRAWINGS

Embodiments of the present invention will now be described, by way of example only, with reference to the attached Figures, wherein.

DETAILED DESCRIPTION

Figure 1:
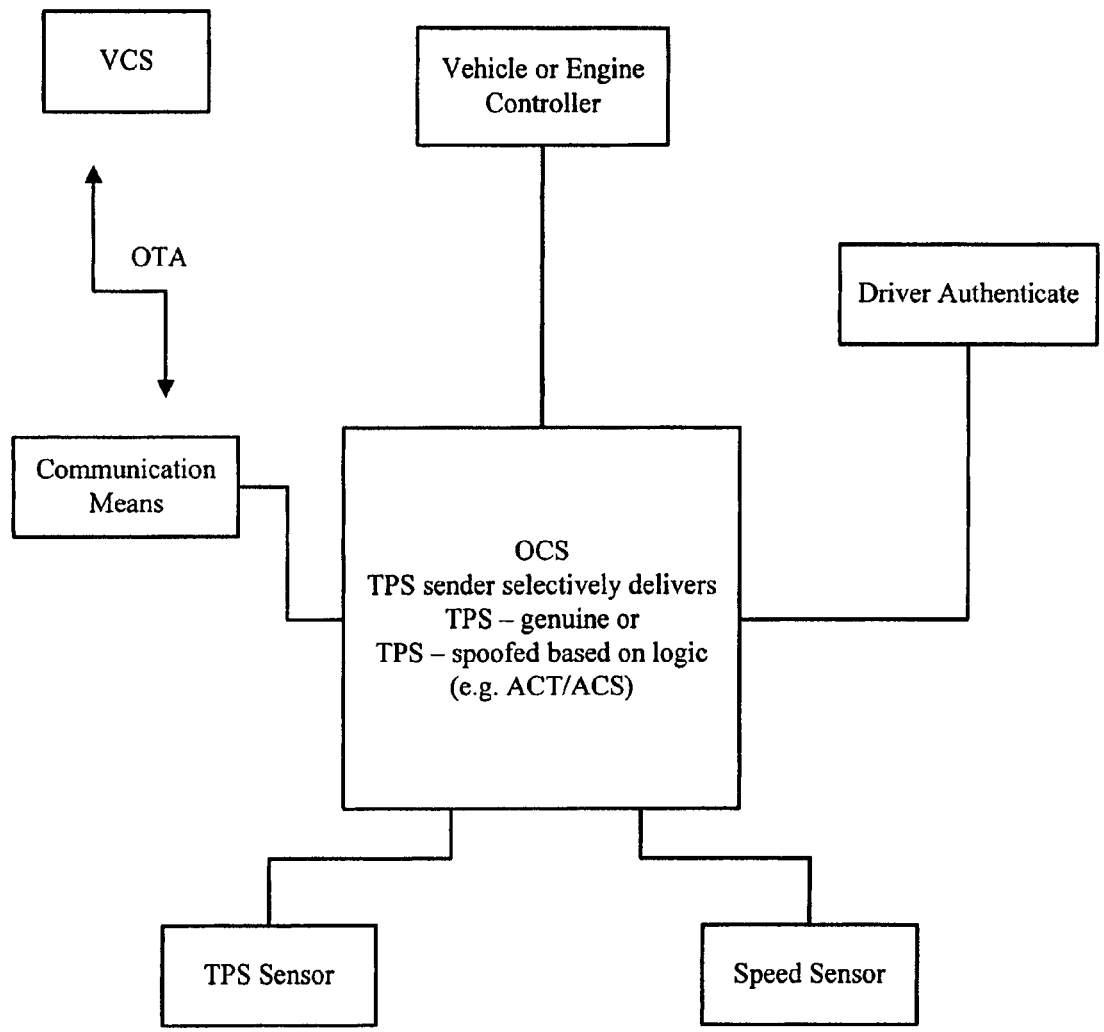
FIG. 1 is an OCS of the present invention.

Generally, the present invention provides a method and system for slowing or stopping a vehicle.

Throttle Position Sensor (Genuine Signal)

A throttle position sensor of a vehicle generates a signal based on the throttle position and that signal is delivered to the vehicle electronic control module (ECM), data bus, engine management system or other system used by the vehicle to control operations. The signal may be analog, digital (e.g. pulse width modulation (PWM)), fibre optic, electromagnetic or other signals known in the art.

Throttle Position Generator (Spoofed Signal)

A throttle position generator generates a signal based on the output of the controller for the Acceleration Control System (ACS)/Acceleration Control Technology (ACT). The throttle position generator is configured with the vehicle at idle state and the signal from the throttle position sensor measured to provide a baseline TP and an internal gain G set to calibrate the throttle position generator to the particular vehicle. The Throttle Position Generator is then capable of generating a signal which the vehicle can interpret as a throttle position signal (spoofed signal).

Acceleration Control Technology (ACT)

ACT provides for selectively intervening upon the ability of the operator of the vehicle to increase or maintain the vehicle speed. In the preferred embodiment, the controller is programmed for setting, receives an Acceleration Control System (ACS) signal for setting, or generates a number of steps (ACS_Steps) and time (ACS_time). Using the vehicle speed, for example from GPS or speed sensor (for example from the speed sensor voltage (SSV), ACS_Steps number of threshold points (ACS_Threshold) are generated. The controller applies the logic: if SSV less than or equal to ACS_threshold, then deliver TPS_genuine to vehicle, and if SSV greater than ACS_threshold, then deliver TPS_spoofed to vehicle (e.g. to engine control module. This is held for ACS_time, at which point ACS_threshold is dropped to the next value.

As an example: If ACS_steps=7, ACS_time=45 seconds, and the SSV corresponds to 100 km/hour, ACS_threshold points would be (approximately): 100, 86, 72, 58, 44, 30, and 16. Upon triggering the ACS, the operator of the vehicle would be allowed control the speed of the vehicle at speeds of 0-100 km/hour, but if the operator tried to increase speed above 100 km/hour, the controller would deliver the TPS_spoofed corresponding to 100 km/hour rather than the TPS_genuine corresponding to the TPS. After 45 seconds, the controller would make the TPS_genuine/TPS_spoofed selection at 86 km/hour, then after another 45 seconds at 72 km/hour and so on until the vehicle is controlled at 16 km/hour (i.e. 270 seconds into it).

In another embodiment, for example, ACT may reduce the vehicle's speed in preset increments, for example 10 km/hour every 30 seconds, which allows the vehicle to be slowly and safely brought to a controlled stop.

The ACS trigger signal can be generated onboard, for example, by triggering a hidden switch, or receiving a hijack or duress code from a driver authentication system, or the ACS could be triggered by an over the air (OTA) signal via satellite, cellular, electromagnetic, radio frequency or other system.

Safety Control Override

Depending on the vehicle and terrain, there are situations where it may be less safe to interfere with the TPS_genuine signal and replacing it with the TPS_spoofed signal. One example is where the vehicle is a loaded semi-trailer truck/tractor trailer traveling downhill. In such a situation, safety and vehicle control are maintained or increased by providing the TPS_genuine signal rather than the TPS_spoofed signal, thus allowing the operator of the vehicle, for example, to increase engine speed in order to change into a lower gear in the case of a manual transmission or otherwise gives the operator a chance to manipulate the engine or transmission to deal with the environment. In the preferred embodiment, the controller may poll or detect the vehicle speed, for example from the SSV, and if the vehicle continues to maintain speed or accelerate despite the controller providing the TPS_spoofed signal instead of the TPS_genuine, then the controller can override and provide the TPS_genuine. The vehicle control unit may include a device or means for determining declination or angle of travel for the vehicle, to determine if, in fact, the vehicle is traveling downhill.

ACS Timeout

In the example above, the final threshold speed of 16 km is attained after approximately 270 seconds. This final threshold speed, or another arbitrary value, for example 10 km/hr may be maintained as a "limp" mode (allowing the vehicle to limp along) indefinitely to allow the vehicle operator the ability to move the vehicle, for example from unsafe situations or hazards, such as from train tracks etc. In the preferred embodiment, the vehicle control unit includes a timer which will force the vehicle to stop after a period of time (ACS_timeout), for example, such as 30 minutes. In the example above, the vehicle would be allowed to travel at a speed as high as 16 km/hour in limp mode, but at the end of ACS_timeout, would be forced to stop, i.e. forced to idle (0 km/hr) or even shut down the vehicle drive, e.g. engine.

Vehicle Already Stopped

In the example above, it was assumed that the vehicle was traveling when the ACS_shutdown signal was received. In the event an ACS_shutdown signal received when the vehicle is at or below a shutdown speed, for example is at 0 km/hr, then there is no need for the controller to go through the step down, but instead can directly go to shutting down the engine or keep the TPS at idle.

Human, Vehicle, and Environmental Elements

While the above ACT and ACS utilize a timer to force a slowdown and ultimate shutdown (vehicle engine or other motive system off) of the vehicle, an ACS shutdown can also be effected in some cases by relying on human, vehicle, and machine elements. That is, in the normal course of operations (even in a chase or hijack situation), the operator may have to slow the vehicle or even stop the vehicle. In such cases, an ACS shutdown may be triggered and then the OCS not force the slowdown, but instead wait for the vehicle to be at a threshold speed, for example 10 km/hour or 0 km/hour and when that threshold is met, to immediately shut down the vehicle. Human elements include, for example, fatigue, hunger, rest stops etc. Vehicle elements include, for example, fuel or equipment failure (real or fake, for example triggering a warning light such as low oil pressure or low fuel may trigger the vehicle operator to slow or stop the vehicle). Environmental elements include, traffic, traffic control devices, weigh scales, uphill travels etc.

Driver Authentication System

The OCS may include a driver authentication system (DAS), for example requiring driver authentication before the vehicle can be operated or moved. The OCS may include a keypad for entering a driver code, for many drivers, for example 30 or 50 or even hundreds or more. The driver codes may be deleted, added, or modified at the OCS or over the air (OTA). The OCS may log the driver codes, for example time, and change of system state (e.g. change from protected state to run state). The driver codes may be numerical or otherwise, for example six digits or seven characters, etc. The driver codes may be kept onboard the OCS in protected memory (that can not be externally read). The DAS may trigger a tamper state and go into a system alarm state after a number of attempts to enter a driver code. Entry of a correct driver code allows operation of the vehicle.

In relation to ACT and an ACS, a new driver code can be sent to the OCS and old driver codes deleted before the ACS shutdown is triggered, for example over the air, as a driver code may normally be used to over-ride the ACS shutdown.

Unattended Idle Protect (UIP)

UIP provides passive engagement without driver intervention when a vehicle is left unattended and idling. UIP secures the vehicle (for example by locking, applying brakes, arming an alarm or other annunciator system) and prevents normal operation until a proper driver authentication is provided, for example by providing a driver code using a keypad, keyboard, smart card, biometrics or other system to allow the system into a run mode. If the vehicle is tampered with in the UIP mode, for example by activating a service brake or releasing a parking break, the vehicle is shut down.

Hijack ACS Shutdown

When combined with an operator authentication system, the onboard control system (OCS) can also trigger an ACS automatically after a period of time, which could be ACS_timeout or another time period. An operator that is hijacked or otherwise under duress may trigger the OCS to generate an ACS signal or trigger and ACS by, for example, activating a hidden switch or activator or by entering a duress authentication code rather than the operators genuine or authentic code.

Maintenance ACS Shutdown

When combined with an operator authentication system having a maintenance mode, for example, where a particular operator is given a limited time to perform a function, such as maintenance on the vehicle, and that time expires, an ACS event can be triggered.

Auxiliary ACS Enunciators

In addition to controlling the vehicle, the OCS may also operate auxiliary vehicle systems to indicate the ACS event, for example: flashing lights or activating sirens or horns either inside the cab of the vehicle or outside or on the vehicle. In the preferred embodiment, the dash lights of the vehicle are flashed and a horn or siren activated in the cab and the marker lights (or tail lights) of the vehicle flashed, for example in an S.O.S. timing pattern.

Other Systems

While described as controlling the TPS by selectively sending the genuine or spoofed signal, the method and system of the present invention is also applicable to other common vehicle systems, which may or may not apply depending on a particular vehicle or type of vehicle. These other vehicle systems include, but are not limited to: transmission operation or gear (e.g. automatic transmission, or electronically controlled transmission), vehicle data bus (e.g. CANbus/CANcontroller, J1850, OBD etc.), engine control module (ECM), powertrain control module (PCM), fuel system, air system, spark system, diesel injector system, engine detune, engine valve bleedoff (Jake Brake™), clutch, torque converter, automatic speed control system (cruise control), traction control system, braking system, propeller pitch, rudder control, flaps, thrust reversers, trim, differential slip, steering, etc.

Features of the present invention may be incorporated into a stand-alone system which is designed to add on to the vehicle, or may be incorporated into the vehicle's existing systems by the original equipment manufacturer (OEM).

Other Vehicles

While described as preferably applicable to tractor-trailer trucks, the system and methods of the present invention are applicable to a wide variety of vehicles, including, cars, trucks, boats, plans, ships, construction vehicles, industrial vehicles, off-road vehicles, military vehicles, commercial vehicles, heavy machines etc. and are applicable to generally any form of motive force gas, electric, diesel, fuel cell etc.

Vehicle Control System (VCS)

The OCS and a vehicle control system (VCS) may communicate, for example by over the air systems previously mentioned. Among other things, the VCS may communicate an ACS signal to the OCS or send or receive commands to/from the OCS or send or receive driver code additions/deletions etc.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for interfering with the operation of a vehicle comprising the steps of:
   a. determining the vehicle speed;
   b. selecting a threshold speed;
   c. controlling the vehicle by allowing operator control if the vehicle speed is less than the threshold speed and interfering with operator control if the vehicle speed is greater than the threshold speed wherein the vehicle speed is reduced to the threshold speed by:
      i. receiving a genuine throttle position signal from a throttle position sensor, the throttle position signal being destined for an engine controller of the vehicle;
      ii. generating a spoofed throttle position signal;
      iii. selectively determining whether to send the genuine throttle control signal or the spoofed throttle control signal to the engine controller based upon a comparison of the vehicle speed to the threshold speed; and
      iv. sending the genuine throttle position signal to the engine controller if the vehicle speed is less than the threshold speed, or sending the spoofed throttle position signal to the engine controller if the vehicle speed is greater than the threshold speed.

2. The method of claim 1, further comprising:
   d. determining vehicle acceleration;
   e. providing an override allowing operator control if the vehicle acceleration is greater than or equal to zero.

3. The method of claim 1, further comprising the step of receiving a trigger signal to initiate the method.

4. The method of claim 3, wherein the trigger signal is sent over the air (OTA).

5. The method of claim 1, further comprising: intercepting the genuine throttle position signal before the genuine throttle position signal reaches the engine controller.

\* \* \* \* \*